United States Patent [19]

Lindgren

[11] Patent Number: 5,480,666
[45] Date of Patent: Jan. 2, 1996

[54] METHOD FOR MAKING BLOCKS OF PASTA FILATA CHEESE

[76] Inventor: Donald S. Lindgren, 1035 S. Webster Ave., Green Bay, Wis. 54301

[21] Appl. No.: 246,770

[22] Filed: May 20, 1994

[51] Int. Cl.[6] ............................. A23C 19/00; A01J 25/00
[52] U.S. Cl. .............................. 426/512; 99/455; 99/464; 99/535; 426/517; 426/582
[58] Field of Search .................... 426/512, 516, 426/517, 518, 524, 582; 99/455, 464, 466, 535

[56] References Cited

U.S. PATENT DOCUMENTS

| | | | |
|---|---|---|---|
| 2,352,210 | 6/1944 | Kraft | 426/517 |
| 2,527,493 | 10/1950 | Condon | 426/524 |
| 3,887,719 | 6/1975 | Miller | 426/517 |
| 4,288,465 | 9/1981 | Meyer | 426/517 |
| 4,339,468 | 7/1982 | Kielsmeier | 426/582 |
| 4,665,811 | 5/1987 | Meyer | 99/455 |
| 4,679,497 | 7/1987 | Tomatis | 99/455 |
| 4,869,161 | 9/1989 | LaCount | 99/455 |

*Primary Examiner*—George Yeung
*Attorney, Agent, or Firm*—Recka & Joannes; Joseph M. Recka

[57] ABSTRACT

A method of making blocks of pasta filata cheese, by laminating ribbons of cheese to a desired thickness, and cutting the ribbons to length. A plastic ribbon of hot, pasta filata cheese is extruded onto a conveyor. While on the conveyor, the ribbon is chilled by either brine, cold water, or super chilled air. Heat is removed from the ribbon, only until the ribbon has set up, and is self supporting. The set up ribbon is stacked on other ribbon while the ribbon is being transported. The stacked ribbons laminate at the ribbon to ribbon contact surfaces. Lengths of the laminated ribbon are cut into blocks.

14 Claims, 6 Drawing Sheets

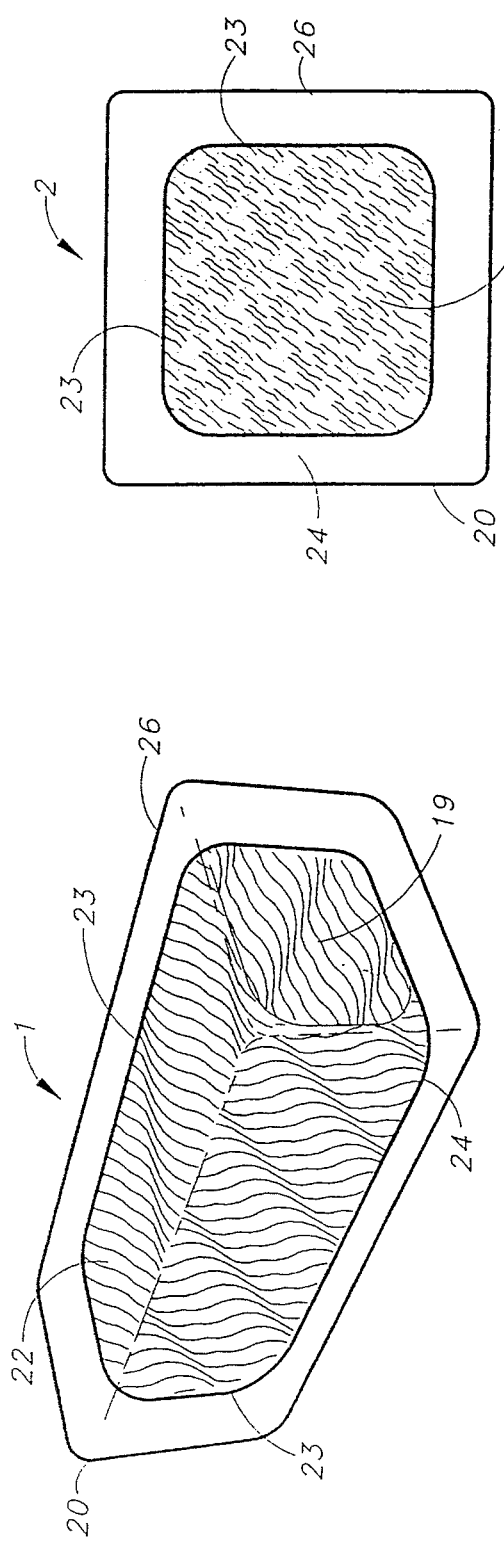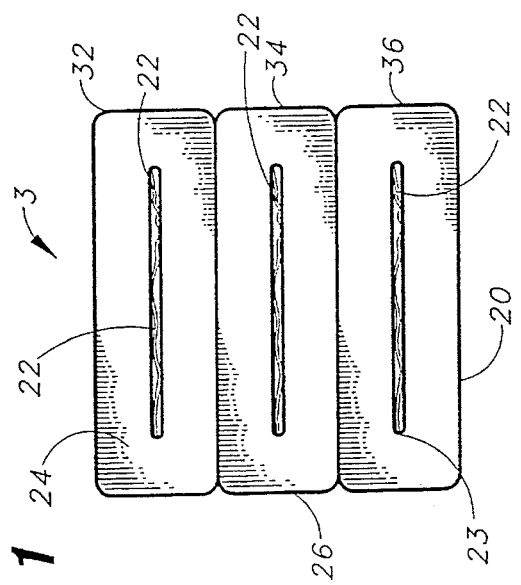
FIG. 1
FIG. 2
FIG. 3

METHOD FOR MAKING BLOCKS OF PASTA FILATA CHEESE

BACKGROUND OF THE INVENTION

The invention is a novel method for making laminated blocks of pasta filata cheese.

Pasta filata cheese is a high volume production cheese used in pizza and other Italian foods. The cheese is purchased by users in the form of blocks, of industry standard sizes. The blocks of cheese are shredded by the users.

The novel method of forming laminated pasta filata cheese blocks, is continuous, with no handling between extrusion, to the step of cutting the laminated ribbons to a desired length.

A plastic ribbon of hot, pasta filata cheese is extruded onto a conveyor. While on the conveyor, the ribbon is chilled by either brine, cold water, or super chilled air. Heat is removed from the ribbon, only until the ribbon has set up, and is self supporting.

The set up ribbon is stacked on other ribbon, while the ribbon is being transported. The stacked ribbons laminate at the ribbon to ribbon contact surfaces. Lengths of the laminated ribbon are cut into blocks.

BACKGROUND OF THE INVENTION

Pasta filata cheese, cheese curd, formed in the cheese making process, is heated and mixed, in a cooker-molder. The curd is heated and mixed until the curd is warm and plastic.

A physical property of the warm, plastic pasta filata cheese curd, is that at certain temperatures, the curd can be extruded. The physical property of extrudability, allows the cheese curd to be manipulated as a plastic. The plastic cheese curd can be molded, formed into strips, and into desired final shapes, while still plastic.

The temperature range, at which curds of pasta filata cheese can be extruded, is from 120 degrees Fahrenheit, to 160 degrees Fahrenheit.

In one prior art method of forming cheese blocks, the melted cheese curd is extruded into a mold, as is shown in U.S. Pat. No. 4,869,161.

A mold is filled with warm plastic, pasta filata, at an extruder outlet. The extruder is then shut off. The filled mold is removed from the extruder outlet. The filling, removal and replacement with empty molds, has been mechanized, and is prior art for making blocks of pasta filata cheese.

A filled mold, when removed from the extruder, contains cheese curd, extruded out of an extrusion head, at a temperature range from 135 to 145 degrees Fahrenheit.

The molds must be chilled to remove the cheese block, formed within the mold. The chilling removes heat from the curd, setting and hardening the cheese curd, that is in contact with the mold.

After the outer surface, of the cheese curd, in the mold, has hardened, the block formed in the mold, is removed.

A cheese block, removed from the mold, has a still plastic inner core. The cheese block, with its plastic inner core, is brined in cold brine, usually in large tanks, to reduce the cheese block core temperature.

The brine salt concentration, of the brine used to chill and float the block, can be adjusted to float and support the cheese block. Floating the block prevents deformation of the formed block caused by slumping.

Chilling in cold brine adds salt to the cheese. The salt brine, in a brine tank or serpentine system, such as is shown in U.S. Pat. No. 4,869,161, supports and floats the cheese block, as well as transports heat out of, and away from, the block.

The cheese block is refrigerated in cold brine, to reduce the center core temperature, of the extruded cheese block, to 45 to 55 degrees Fahrenheit. When the cheese block center core temperature is preferably 45 to 55 degrees Fahrenheit, the cheese block can be packaged.

Another method shown in prior art, for forming cheese pieces, is the system shown in U.S. Pat. No. 4,339,468. A ribbon of cheese is extruded into a brine stream. The ribbon is supported by, and transported by the brine stream. Fifty foot lengths of extruded ribbon, formed by this system, are cut off at the extruder head. The lengths are then lifted up out of the forming trough. The lengths are put into a brine tank for cooling. After cooling in the brine tank, the ribbons are removed and cut to desired lengths.

SHORT SUMMARY OF THE INVENTION

Two issues are addressed by this invention.

The first issue, is decreasing the time necessary to cool a cheese block, so that block production can be a continuous process, from extrusion head to packaging.

The second issue is cooling by a cooling medium other than brine.

A cheese block is cooled, from extrusion temperature, to a "set up" temperature.

By "set up" temperature is meant the cheese ribbon has been chilled, to a temperature low enough, so that the ribbon will be self supporting.

An alternate definition of the temperature to which the ribbon is cooled, is above the "slump temperature". The "slump temperature" is higher, for a ribbon, substantially greater in width, than in height, than it is for a block. As the cheese cools, the strength and resistance to deformation, rapidly increases.

The ribbon is self supporting when an outer layer of cheese, chilled to hardness, surrounds an inner layer of still plastic cheese curd, substantially warmer than the outer layer.

The inner core, within a molded block, remains molten at the set up temperature. The reason the inner core remains molten is because the rate of heat transfer through the extruded cheese curd in the mold, is slow.

Heat transfer from the molten inner core, is a function of the thickness of the cheese block, normal to the heat flow out of the block.

Heat transfer from the center of the block is time dependent. That is, it takes time for the block to cool off.

A block of cheese, with a molten inner core, cannot be processed. If such a cheese block is placed on a surface, without support, the cheese block will slump and deform.

As the cheese block is chilled, the strength, in terms of resistance to deformation of the block, increases.

The new method is a continuous process of forming cheese blocks, from extrusion through packaging, without the delay of a separate cooling step.

During processing, the thickness of the cheese normal to heat flow, is greatly reduced, and the surface of the cheese exposed to a chilling medium, is greatly increased. The cheese, reduced in dimension to increase cooling, is then recombined to a desired thickness.

The improvement is in forming ribbons, on a moving conveyor, and combining those ribbons into a block.

Continuous ribbons, of generally rectilinear cross section, of pasta filata cheese, are formed by extruding onto take away conveyors. The ribbons are chilled, while on the take away conveyors, by a spray of chilled salt brine, chilled clear water or by super cooled air. Super cooled air, is air that has passed through a heat exchanger, containing liquid nitrogen. The chilled ribbons are stacked, and laminated, into a required thickness. The laminated ribbon is cut into cheese blocks.

A freshly formed, flat, cheese ribbon stacked on top of another freshly formed cheese ribbon, will grow together, at the contact surface. Applying pressure normal to the contact surfaces of the ribbons, increases lamination.

The block formed by the disclosed method, is made up of adhering ribbons.

The laminated block, formed from the adhering ribbons, is resistant to pulling apart.

When tested, to determine resistance of the block, formed by laminations, to pulling apart, by a load applied normal to the grown together surfaces, the laminated block, pulls apart, other than at the joined surfaces.

Prior art chilling means, using brine at 5 to 30 degrees Fahrenheit, in a tank, chilled a block, to an inner core temperature of 55 degrees Fahrenheit. When the inner core temperature was lowered to 55 degrees Fahrenheit, a thermal gradient existed. The thermal gradient was from the outside of the cheese block, at 5 to 30 degrees Fahrenheit, to the inner 55 degree temperature.

In the prior art, the exterior temperature, of the formed extruded block, can be as low as 5 degrees Fahrenheit, when chilled in super saturated brine.

It is not necessary to chill the block for as long, nor as cold, using the new method.

The second issue addressed is the cooling media. Prior art devices, and methods, use brine as the cooling media.

The new method provides for an alternate cooling media. Cold water is used to cool the cheese ribbon. Alternately, super chilled air is used as the cooling media. Air is super cooled by passing through liquid nitrogen cooled heat exchangers.

Salt is added to pasta filata. Some of the salt is added during processing, during the mixing and melting of the curd. Salt is added during brining.

Salt is added to a block of pasta filata, through the outside surface of the block, as the block is chilling in a brine tank. The amount of salt added in the chilling brine tank, is small.

The method shown, if brine is not used as the chilling media, requires that the small amount of salt that would otherwise be taken up by the block in chilling, be added during the mixing and melting of the curd.

Preferably, the chilling media is not brine. Cold water or super cooled air are the preferred cooling media.

Cold water, or super cooled air, is not corrosive to the processing equipment. Used and contaminated brine is a biohazard. Brine is a pollutant.

The ribbons of set up, extruded cheese, are stacked on each other. Each ribbon is chilled to a temperature, below the set up temperature of the cheese.

The cheese ribbons can be chilled to the desired 55 degree Fahrenheit processing temperature, prior to stacking.

In the best method, the stacked ribbons, are stacked while warmer than 55 degrees Fahrenheit. The stacked ribbons grow together at the ribbon contact surface, laminating the ribbons into a block. The stacked ribbons may be compressed, by a compression roller, mounted over the conveyor, to increase lamination.

Heat sealing of the laminated block, by a hot water bath, heat shrunk plastic, serves to weld the edges of the laminated block and to squeeze the ribbons, making up the block, tightly together, improving lamination.

Final cooling, of packaged, laminated blocks of pasta filata, can be done after packaging. Final cooling can be completed, in the cooler used to store finished product.

DRAWINGS

The method and apparatus of this invention is illustrated by the accompanying drawings.

FIG. 1 is a shadow view, of a partially chilled, cheese block, and molten inner core.

FIG. 2 is a section view, of a cut, through the middle of the cheese block, shown in FIG. 1.

FIG. 3 is a section view, of a cut, through the middle of a cheese block, formed by lamination of three ribbons.

DESCRIPTION OF THE PREFERRED EMBODIMENT

Figure 4:
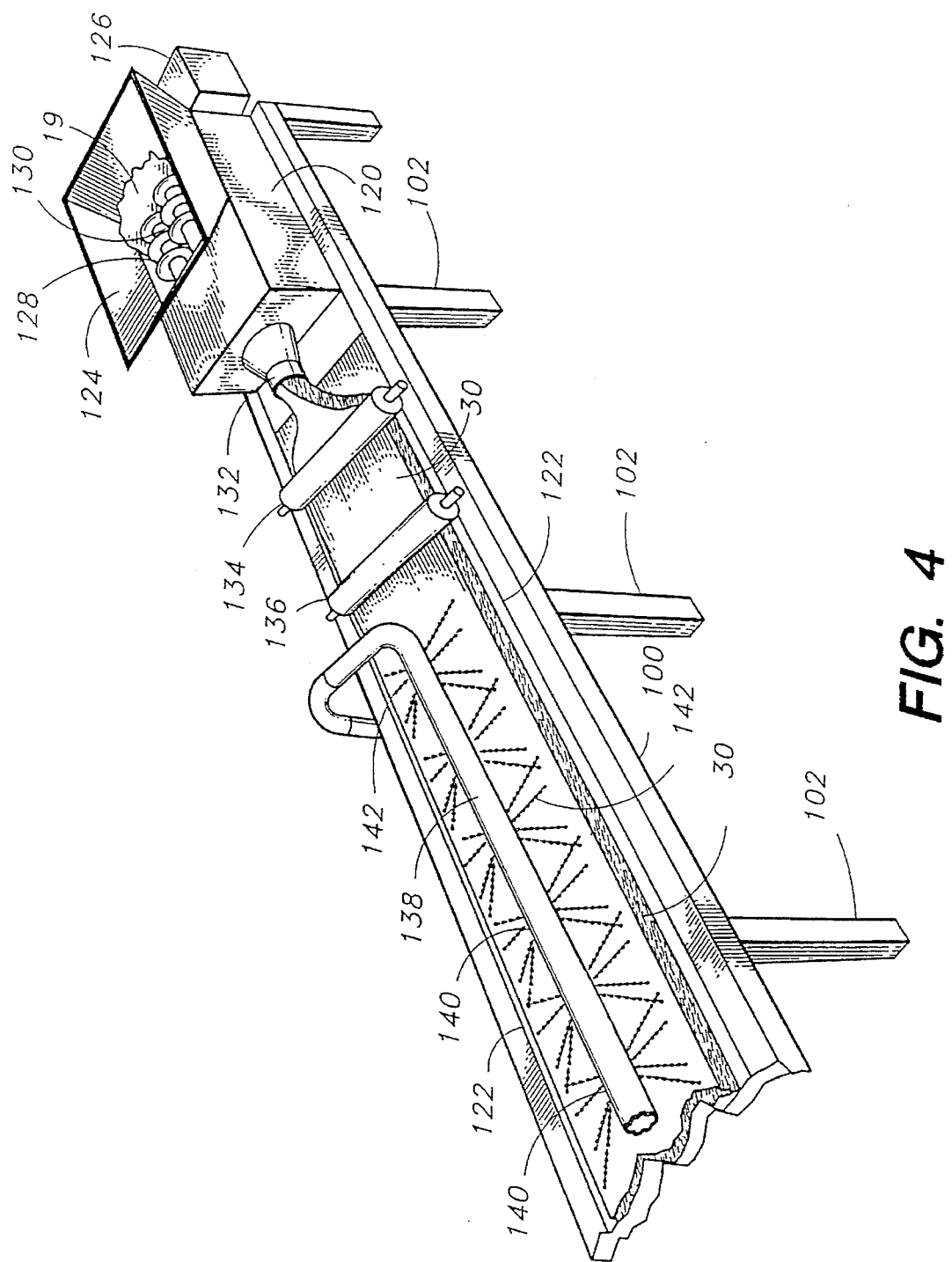
FIG. 4 is a perspective view, of a machine, used for forming multiple ribbons of pasta filata, to be laminated into a block. A single ribbon of cheese, is extruded, flattened by compression rollers, chilled while passing along a conveyor, and slit into multiple ribbons.

The parts making up the invention, and discussed in the disclosure, are the following:

| | |
|---|---|
| Cheese Curds | 19 |
| Block of Pasta Filata Cheese | 20 |
| Molten Inner Core | 22 |
| Outer Edge of Molten Inner Core | 23 |
| Chilled Layer | 24 |
| External Surface | 26 |
| Thermal Gradient | 28 |
| Ribbon | 30 |
| Ribbons | 32, 34, 36 |

5,480,666

-continued

| Frame | 100 |
|---|---|
| Legs | 102 |
| Extruder | 120 |
| Extruder Take Away Conveyor | 122 |
| Extruder Receiver Hopper | 124 |
| Extruder Drive Motor | 126 |
| Augers | 128 |
| Augers | 130 |
| Extruder Face Plate Aperatures | 131, 131' and 131" |
| Extruder Face Plate | 132 |
| First Compression Roller | 134 |
| Second Compression Roller | 136 |
| Chiller Manifold | 138 |
| Chiller Outlets | 140 |
| Refrigerating Medium | 142 |
| Brine | 144 |
| Cold Water | 146 |
| Super Chilled Air | 148 |
| Slitter Knives | 200 and 202 |
| Assembly and Laminating Conveyor | 204 |
| Ribbon Support Roller | 206, 208 and 210 |
| Compression Rollers | 212, 214, and 216 |
| Lamination Line | 218 |
| Cut Off Knife | 220 |
| Cut Off Knife Pneumatic Cylinder | 222 |
| Assembly and Laminating Conveyor Frame | 226 |
| Rollers | 228 and 230 |
| Assembly Conveyor Frame Legs | 230 |
| Multiple Take Away Conveyors | 300, 302 and 304 |
| Vertical Rollers | 306, 308 |
| Compression Roller | 310 |
| Vacuum Sealing Machine | 500 |
| Shrinkable Plastic Bag | 501 |
| Rotary Table | 502 |
| Packaging Conveyor | 504 |
| Hot Water Packaging Through Tunnel | 506 |
| Packaged Block | 508 |

FIG. 1 is a shadow view, of a block 20, of pasta filata cheese. Block 20, is formed by extruding cheese curds 19, into a mold.

The extruded cheese curds 19, remain molten, within block 20, of pasta filata cheese. The molten inner core 22, floats within, and is suspended by, chilled layer 24, formed between the external surface 26, of the block 20, and the outer edge 23, of the molten inner core 22.

FIG. 2 is a section view, of a cut through the middle of the cheese block, shown in FIG. 1. FIG. 2, is included, to simplify the explanation, of heat transfer, addressed by the new method.

Block 20, is shown with a molten inner core 22, and a set up or chilled layer 24, between the molten inner core 22, and the external surface 26, of the block 20.

Heat is transferred, at the external surface 26, of the block 20 to a refrigerating medium 142. A thermal gradient 28, not shown, is formed, across the chilled layer 24, between the molten inner core 22, and the external surface 26.

The molten inner core 22, of pasta filata cheese, sets up, that is solidifies, in the form of, ever smaller shells, of set up cheese. When the center core temperature reaches set up temperature, the block 20, is solid.

Heat is uniformly in transit, from the center core 22, to the chilled outside surface 26, of block 20, because of the temperature differential, between the two surfaces.

A block 20, such as shown in FIG. 1, must be chilled until the cheese has the strength, to resist slumping. Until the chilled layer 24, has enough strength, to support the block 20, and enough heat has transferred, from the inner core 22, to prevent remelting, or softening, of chilled layer 24.

When the cooling, at the external surface 26, of the block 20, is stopped, the temperature through the block, will stabilize, to an equilibrium temperature.

If the thermal gradient, between the cooling surface 26, and the inner core 22, is not steep enough, so that the final temperature of the block 20, at equilibrium, is above the slump temperature, the block 20, will slump, as the inner core 22, reheats the chilled layer 24.

FIG. 3 is a section view, of a cut, through the middle of a cheese block, formed by lamination of three ribbons.

The block 20, shown in FIG. 3, is formed of three ribbons, 32, 34 and 36. The molten inner core 22, of each ribbon, is surrounded by a chilled layer 24. The thickness of each chilled layer 24, in FIG. 3, is the same thickness 24, shown in FIG. 2.

The block 20, shown in FIG. 3, formed by ribbons 32, 34 and 36, has three much smaller, molten inner cores 22, for the same chilling time.

Block 20, shown in FIG. 3, will not slump.

FIG. 4 is a perspective view, of one machine used for forming multiple ribbons 30, to be laminated.

A single ribbon 30, of pasta filata cheese is extruded, on to a conveyor 122, flattened by compression rollers 134 and 136, which are mounted over the conveyor 122. The ribbon is chilled while passing along conveyor 122. The ribbon is slit into multiple ribbons 32, 34 and 36.

Frame 100, mounted on legs 102, supports extruder 120, and extruder take away conveyor 122. Extruder receiver hopper 124 is mounted on top of extruder 120. At the rear of extruder 120 can be seen drive motor 126.

Inside extruder 120, are two counter rotating augers 128 and 130. Augers 128 and 130 force warm plastic cheese curds 19, placed in the extruder receiver hopper 124, out of the extruder 120, through extruder face plate 132, in this design, as a single ribbon 30 of pasta filata.

The ribbon 30, of pasta filata, extruded through, extruder face plate 132, is extruded onto extruder take away conveyor 122.

Conveyor 122 continuously transports the extruded ribbon away from the extruder head, towards the chiller.

The still plastic cheese curd 19, extruded as ribbon 30, flattens out on take away conveyor 122.

First compression roller 134, displaced from extruder face plate 132, flattens out ribbon 30. First compression roller 134 and second compression roller 136, are mounted in bearings, not shown. The bearings themselves are affixed to frame 100 by bolted in pillow blocks, not shown.

The first compression roller 134, compresses the ribbon 30, and spreads the ribbon 30 out on conveyor 122.

Second compression roller 136 further reduces the thickness of ribbon 30, transported by take away conveyor 122. Both rollers 134, and 136, can be chilled to increase heat removal from the ribbon 30.

Chiller manifold 138, is shown in FIG. 4, as being displaced from the second compression roller 136. The chiller manifold 138, can be mounted at any point between the extruder face plate 132 and the end of the take away conveyor 122.

Chiller outlets 140, are shown in FIG. 4, spraying chilling medium 142, which can be brine 144, cold water 144, or super chilled air 146, onto ribbon 30, as ribbon 30 is transported under the chiller outlets 140, on take away conveyor 122.

Figure 5:
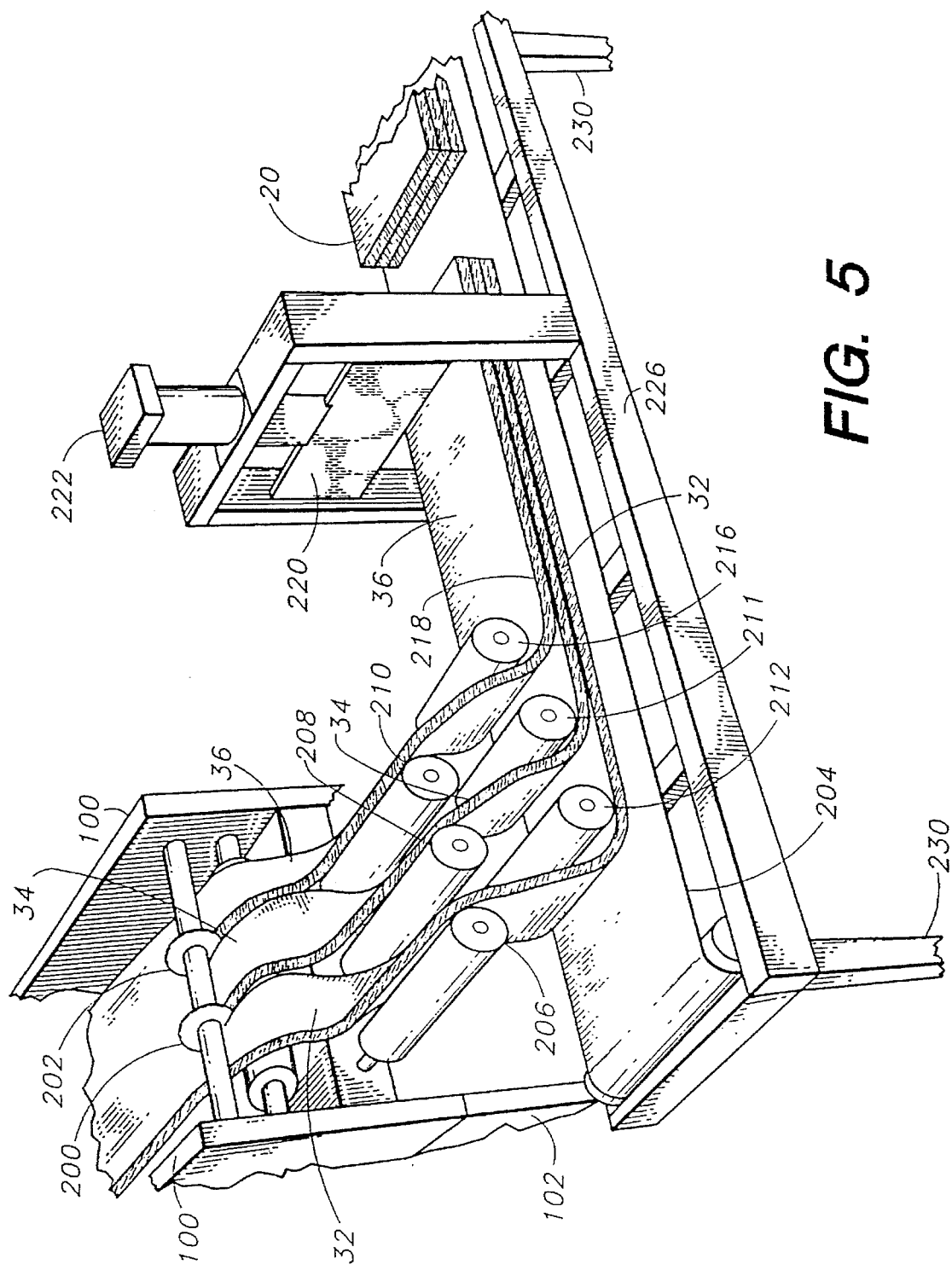
FIG. 5 is a perspective view, of the ribbon former in FIG. 4, showing transposition, of the formed cheese ribbons, a second set of compression rollers, cheese ribbon take away conveyor, slitter, assembly and laminating conveyor, and cut off knife.

FIG. 5 is a perspective view of the end of the block forming device in FIG. 4. FIG. 5 shows transposition, that is a change of direction of 90 degrees, and stacking, of formed cheese ribbons 32, 34 and 36. Cheese ribbons 32, 34 and 36 are formed by slitter knives 200 and 202.

At the top of FIG. 5 can be seen frame 100, and legs 102.

Frame 100, and legs 102, are best seen in FIG. 4.

A second conveyor 204, denominated assembly and laminating conveyor, is mounted at 90 degrees, to extruder take away conveyor 122. Several methods can be used to overlap the slit ribbons 32, 34 and 36. The ribbons can be rotated 180 degrees towards each other, to form the overlapping ribbon. The method chosen was to rotate each ribbon 90 degrees horizontally, and 90 degrees vertically.

The extruder take away conveyor 122 is attached at one end, to frame 100.

Mounted at the end of extruder take away conveyor 122, are slitter knives 200 and 202. Slitter knives 200 and 202 are mounted to frame 100. As ribbon 30 is transported along extruder take away conveyor 122, ribbon 30 passes through slitter knives 200 and 202, dividing ribbon 30 into three ribbons 32, 34 and 36. Different numbers of slitter knives can be mounted to divide the ribbon into the desired number of laminations, or width the ribbon to be stacked.

The three ribbons 32, 34 and 36, are lowered onto assembly and laminating conveyor 204. Transport on the assembly and laminating conveyor 204 is in a direction normal to the direction of transport of the extruder take away conveyor 122.

Each of the three ribbons 32, 34 and 36 passes over a ribbon support roller 206, 208 and 210. Ribbon support rollers 206, 208, and 210 are mounted on the center line of each of the ribbons 30. A ribbon 30 passing between roller 206 and 208 is rotated approximately 90 degrees to the assembly and laminating conveyor 204.

Compression rollers 212, 214 and 216 are cantilevered from frame 100. Compression rollers 212, 214 and 216 compress the cheese ribbon 30, as the cheese ribbon 30, is transported on assembly and laminating conveyor 204. At compression roller 216, all of the ribbons 30 are compressed.

A line on the conveyor 204, where all the ribbons meet, and are compressed, is denominated the lamination line, 218.

Cut off knife 220, is mounted above assembly and laminating conveyor 204. The cut off knife 220 is operated by pneumatic cylinder 222. Block 20 can be seen to the right of the cut off knife 220.

The assembly and laminating conveyor 204 is mounted on frame 226. The assembly and laminating conveyor 204 is mounted between rollers 228 and 230. The rollers 228 and 230 are journaled into the frame 226. Assembly conveyor legs 230 support frame 226.

Figure 6:
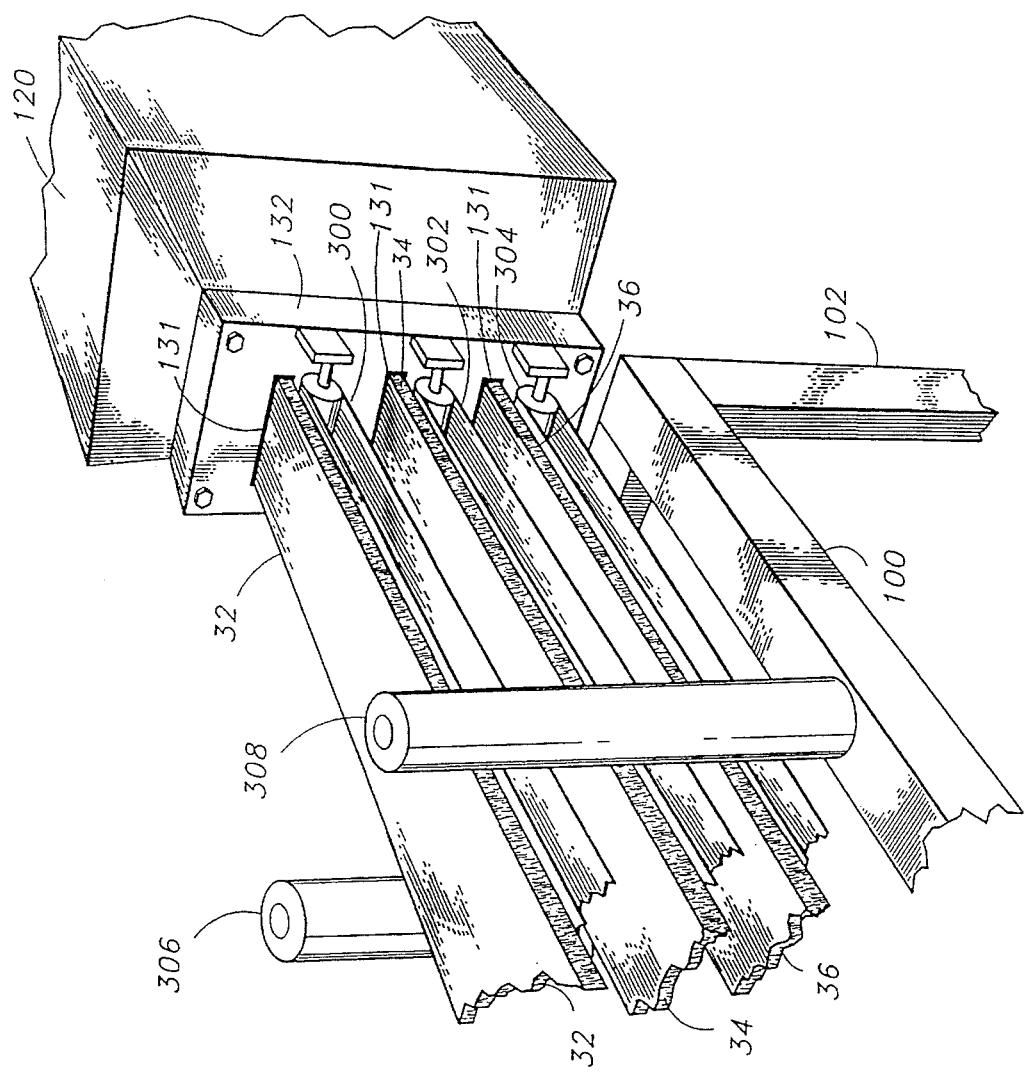
FIG. 6 is a perspective view, of a second machine, for forming multiple ribbons of pasta filata, to be laminated into a block. A cheese extruder head, multiple ribbons of cheese being extruded, and conveyors carrying the cheese ribbon from the extruder are shown.

FIG. 6 is a perspective view of a second machine for forming blocks of pasta filata cheese. FIG. 6 shows cheese extruder face plate 132, multiple ribbons 32, 34 and 36, being extruded, and conveyors 121, 122 and 123, transporting the cheese ribbon 30 from extruder 120. An extruder, such as extruder 120, would be used in either the ribbon forming machine shown in FIG. 6, or the ribbon forming machine shown in FIG. 4.

Figure 7:
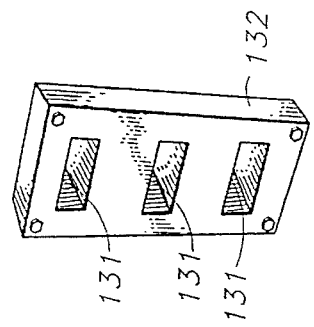
FIG. 7 is a perspective view, of a three ribbon extrusion head, used to extrude three cheese ribbons.
Figure 8:
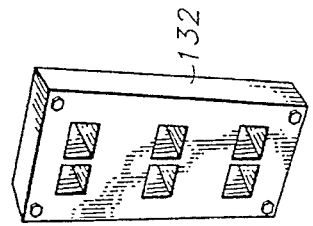
FIG. 8 is a perspective view, of a six ribbon extrusion head, used to extrude six ribbons, in parallel groups of three.

The extruder face plate 132, would be changed from a single aperture face plate as shown in FIG. 4, to a multiple aperture face plate, as shown in FIG. 7 and in FIG. 8.

Receiver hopper 124, on extruder 120, is filled with cheese curd 19. Extruder face plate 132 is shown, in this example, having three face plate apertures 131, 131' and 131". Each aperture 131, extrudes one of three ribbons, 32, 34 and 36 of pasta filata. Chiller manifold 138, is best seen in FIG. 9.

Figure 9:
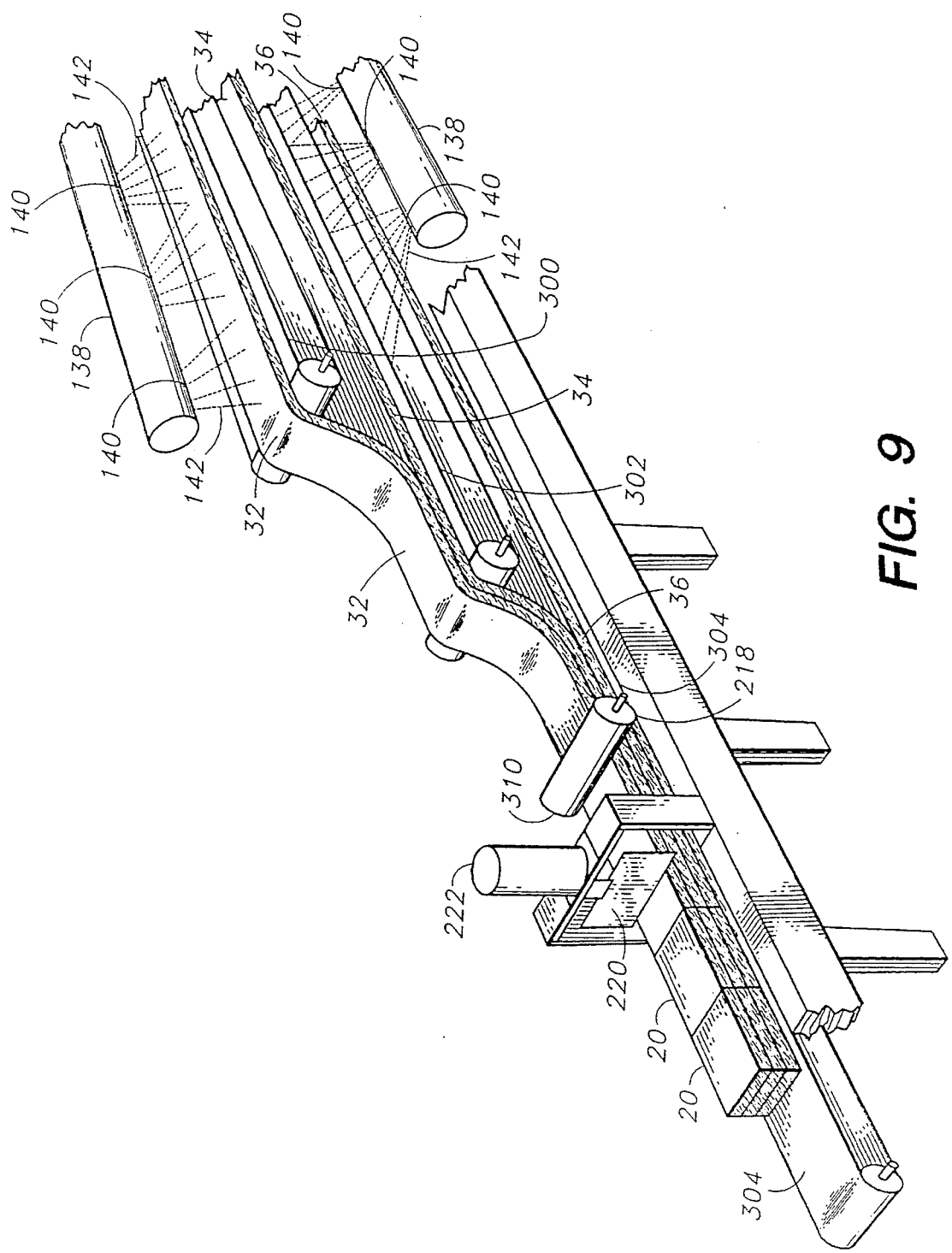
FIG. 9 is a perspective view, of the extruder and ribbon former, shown in FIG. 4, showing the chiller, laminating conveyor and cut off knife.

Multiple take away conveyors 300, 302 and 304 are shown in FIG. 9.

Conveyors 300, 302 and 304 transport ribbons 32, 34 and 36 away from extruder face plate 132. Chilling manifold 138, is shown in FIG. 9. Chilling manifold 138 supplies chilling medium 142, to outlets 140. Brine 144, cold water 146 or super cooled air 148, is ejected out of outlets 140, onto ribbons 32, 34 and 36.

Vertical rollers 306 and 308, best shown in FIG. 6, mounted to frame 100, bear on the sides of ribbons 32, 34 and 36. Vertical rollers 306 and 308 form and maintain a square edge on ribbons 32, 34 and 36. Vertical rollers 306 and 308 may be chilled to remove heat selectively from the edges of the ribbon.

FIG. 9 is a perspective view of extruder 120 and multiple ribbons 32, 34 and 36 formed by the device shown in FIG. 6. FIG. 9 shows chiller manifold 138, chiller outlets 140 and chilling medium being sprayed 142.

FIG. 9 shows ribbon 32 as it transported on conveyor 300 being lowered on top of ribbon 34; FIG. 9 shows ribbon 32 and ribbon 34, dropping off conveyor 302, onto ribbon 36, and onto conveyor 304.

Compression roller 310, compresses the three ribbons 32, 34 and 36 at the lamination line 218. The ribbons 32, 34 and 36 are compressed to desired thickness.

Cut off knife 220 is shown mounted over conveyor 304. Cut off knife 220 is operated by cut off knife, pneumatic cylinder, 222, as the laminated ribbon is transported on the conveyor, under the cut off knife. Blocks 20 can be seen on conveyor 304.

Figure 10:
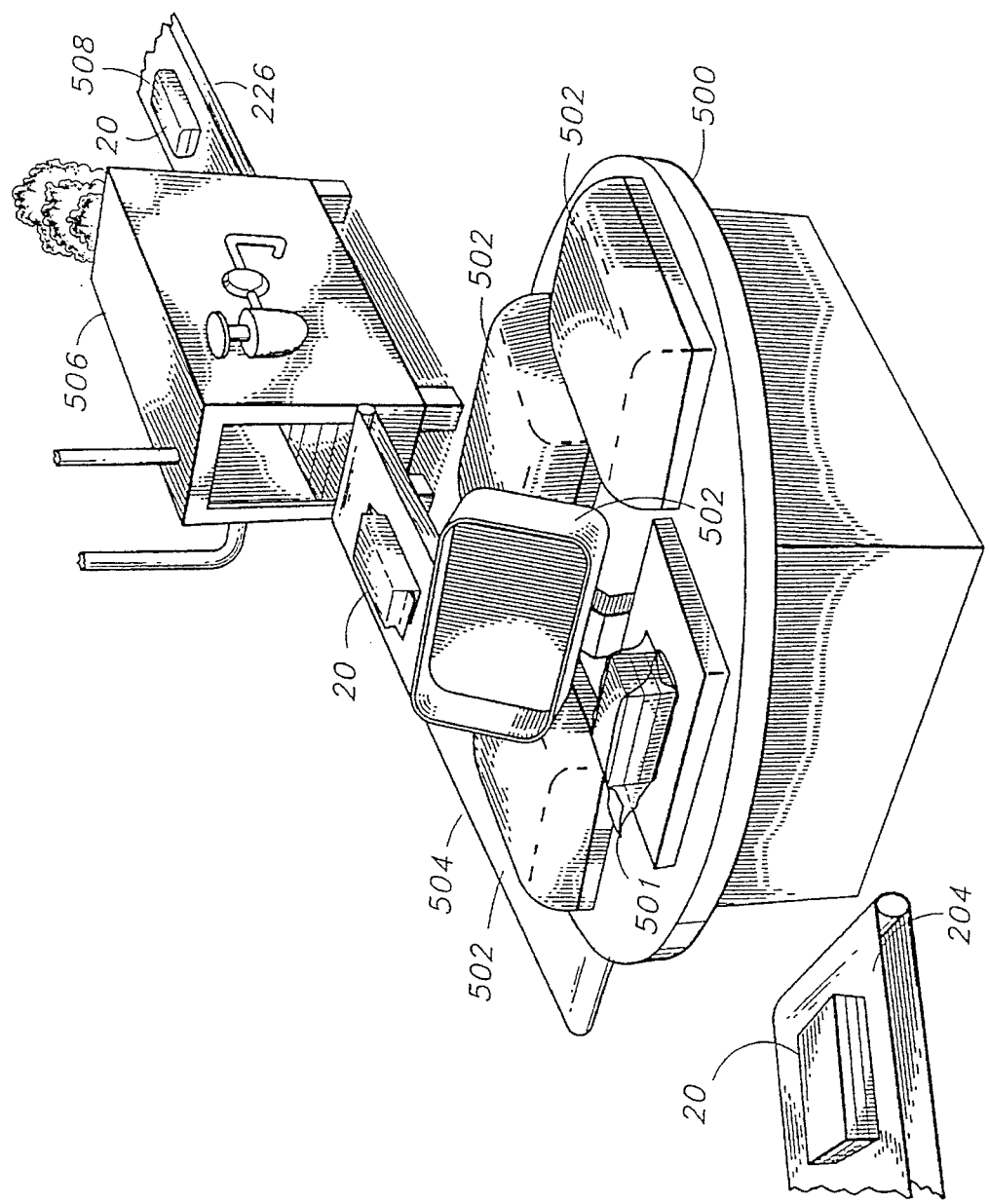
FIG. 10 is a perspective view, of the end of the conveyor, vacuum sealing device, and hot water heat sealer, used to package the laminated blocks.

FIG. 10 is a perspective view of the end of conveyor 204, vacuum sealing machine 500, vacuum sealing chambers 502, packaging conveyor 504, and hot water heat sealer 506, and packaged block 508.

The packaging end of the conveyor 204 is the same, whether used with the ribbon forming machine shown in FIG. 4 or the ribbon forming machine shown in FIG. 6.

A cheese block 20, transported to the end of conveyor 204, is loaded into a shrinkable plastic bag 501. The plastic bag 501 is placed in the vacuum sealing machine 500. Air is vacuumed from plastic bag 501.

The vacuumed bag 501, with its included cheese block 20, is placed on a packaging conveyor 504. Mounted along the packaging conveyor 504, is a hot water packaging through-tunnel 506. The plastic chosen to package the cheese block 20, is heat sensitive. The hot water in the packaging through-tunnel 506, shrinks the plastic wrap, 501, to a tight fit around cheese block 20. The cheese block with its tightly shrunk wrapping 501, is denominated as packaged block 508.

The cheese block 20 formed by this system, has heat transferred to the block 20, at the external surface of the block 26, through the thin plastic packaging 501, when the block is heat sealed. The heat transfer causes the edges of the packaged block 508 to weld together at the external surface 26.

The cheese block 20 is compressed by the thin plastic packaging 501, as the thin plastic packaging 501 is heated and shrunk by the hot water bath in tunnel 506. The compression causes the packaged block 508 to further laminate.

The vacuum sealing, the plastic packaging 501, and the hot water shrinking of the packaging around block 20, are old in the art. The vacuuming sealing step, and the hot water shrinking of the packaging has not been used to contribute to the lamination of a block of pasta filata, formed of laminated ribbons. The prior art method, of forming blocks of pasta filata cheese, in molds, is a batch method, rather than a continuous method.

All the steps, in the prior art method of forming blocks, are performed sequentially, with time delays between each step. The prior art method, as reduced to steps, is:

a. Warm plastic curds are loaded into an extruder;
   [Handling Point]
b. Mold placed in front of extruder head;
c. Cheese curds extruded until mold full;
   [Dwell Time]
   [Handling Point]
d. Full mold removed from extruder head;
e. New empty mold placed at extruder head;
   [Handling Point]
f. Molds are reversed on a table to square the end of the block;
   [Dwell Time]
   [Handling Point]
g. Mold placed in chill chamber;
h. Mold chilled to remove heat, the chilling forming cheese blocks out of the molded curd within the mold;
   [Dwell Time]
   [Handling Point]
i. Chilled molds removed from chill chamber;
   [Handling Point]
j. Cheese blocks formed in mold, removed from mold;
   [Handling Point]
k. Cheese blocks formed in mold, placed in brine tank;
   [Dwell Time]
l. Cheese blocks held in brine tank, until center core temperature cooled to 55 degrees Fahrenheit;
   [Handling Point]
m. Cooled cheese blocks, removed from brine tank, and transferred to packaging;
n. Cheese block bagged;
o. Bag shrink wrapped and placed in cooler.

The invention substantially reduces the number of steps needed to form a block of pasta filata cheese:

AA: Heated curds are extruded in the form of continuous ribbon of warm plastic pasta filata;
BB: The extruded ribbon is chilled, while being transported, until the ribbon sets up;
CC: The extruded, set up ribbon is stacked, one ribbon on top of another ribbon, lengthwise, during transport, to a desired thickness;
DD: The stacked ribbons, are compressed to a desired thickness, during transport;
EE: The compressed ribbons, are cut into lengths;
FF: Blocks of laminated, cut, compressed ribbon are bagged;
GG: The bag, with its enclosed block of pasta filata, is heat shrunk and placed in a cooler.

The new process is continuous. Once the warm, plastic, cheese curds, are loaded into extruder 120, there are no further handling steps.

All of the handling steps, between loading the extruder 120, and taking the packaged block 20 off conveyor 226, are eliminated in the new method.

BEST METHOD

Multiple ribbons of pasta filata are extruded from an extrusion die. A pair of counter rotating augers forces the warm plastic pasta filata cheese through the extrusion die.

In the first machine shown, one ribbon of pasta filata cheese, substantially wider than it is thick, is extruded onto a conveyor. The extruded pasta filata ribbon passes under compression rollers forming a wide ribbon. The wide ribbon is cooled. The wide ribbon is slit into multiple ribbons of dimensions suitable for lamination. That is, except for length, the laminated ribbons are the correct dimension for the desired cheese block. The ribbons are stacked one on top of the other to a desired thickness, and laminated. The laminated ribbons are then cut to the desired length.

In an alternate format, multiple ribbons of pasta filata cheese, substantially wider than they are thick, are co-extruded through an extrusion die, onto take away conveyors. Above and below each take away conveyor, chilled water, brine or super chilled air is sprayed on the cheese ribbons.

In both devices, the cheese ribbons are transferred on conveyors, to a ribbon assembly and lamination line. At the ribbon assembly and lamination line, the multiple ribbons, either extruded out of the die, or slit, are indexed to lie one upon the other.

The cheese ribbons are cooled, after extrusion, to a temperature, at the lamination line, below slump temperature.

The extruded pasta filata is still warm at the assembly and lamination line. The lamination line is where one ribbon is laid on top of another ribbon.

The outside surface temperature of each ribbon is 55 degrees. The inner core temperature of each ribbon, at the line of lamination, can be as high as 85 to 90 degrees Fahrenheit. The higher the inner core temperature, and the higher the temperature of the outside surface of the ribbon, the more thorough will be the lamination of the stacked ribbons.

The extruded, laminated ribbons of pasta filata, are further compressed to the desired thickness.

The laminations of warm set up cheese weld together, at the freshly formed contact surfaces, to form a block.

From the assembly and lamination line, the laminated ribbons of pasta filata are passed to a cutting station. At the cutting station, a knife cuts the cheese ribbon into the desired lengths.

The cheese blocks, cut from the laminated ribbons, are transported on a conveyor to a vacuum packing machine. A heat sealable plastic cover is put around the cheese block formed from the laminated ribbons.

After vacuum packing, the plastic covered cheese block passes to a hot water bath, which both shrinks the plastic covering and welds the edges of the laminated cheese block.

The laminated block, is formed, in the best method, not at the 55 degree Fahrenheit processing temperature usually used in prior art, but at a higher temperature. The laminated block can be formed at 55 degrees Fahrenheit.

The optimum temperature, to cool the cheese ribbon, prior to lamination, is determined by the operator. The higher the temperature of the ribbon at the lamination line, the more completely the block formed, laminates into a solid block.

The higher the temperature at the cutting line, the more likely the block formed out of the laminated ribbons will deform, either by slumping, or by the action of the cut off knife.

This cheese block forming method, is continuous from the extruder, to vacuum packing, and heat sealing. Chilling takes place between extruder head, and the lamination line.

The cheese blocks formed from the laminated ribbons are transferred from packaging to a cooler, for storage, and where the blocks can continue to cool off.

The improvement makes the molding to packaging process, a continuous process.

The improvement eliminates much machinery, including the brine tank and molding machines. The improvement saves energy, because the chilling units required in the prior art, at each dwell point, are not necessary.

DIMENSIONS IN BEST METHOD

In the best method, the ribbon is extruded 1½ inches thick, 24 inches wide. The 24 inches width formed by the roller method, are then slit into three, eight inch wide ribbons, prior to lamination.

By combining three ribbons, 1½ inch thick, eight inches wide, a continuous extrusion eight inches wide by 4½ inches thick, is produced. The continuous ribbon is cut into desired sizes.

In the best method, three ribbons are formed, either by the slitting process, or by multiple extrusion of three ribbons. More ribbons, thinner ribbons, can be formed to assemble the desired 4 ½ inch thick, eight inch wide, extrusion. The device becomes more complicated, the more ribbons that are stacked to form a block.

A block, twenty inches long, of pasta filata cheese, formed out of the 1½ inch thick, 8 inch wide ribbons, will weigh approximately 20 pounds. One industry standard size, pasta filata cheese loaf, is 20 pounds, and requires the cited dimensions.

Another industry, standard size loaf, is a five pound loaf. The five pound loaf, is formed by making six ribbons, four inches wide, and laminating two rows of three ribbons. Laminating two rows of three ribbons can be done by using the slitter in FIG. 7, to cut six ribbons. Laminating two rows of three ribbons can also be done by mounting a six ribbon extrusion plate, with two parallel rows of three extrusion outlets, in the front of the extruder, as in FIG. 7.

The cooling section between the extruder head and the lamination point, or the slitter, is long enough, in the best method, to provide 20 minutes retention time, of the ribbon, under the chilling media. Retention time is that the cheese ribbon is maintained under the chilling media, while being moved along the conveyor.

Retention time may be changed by changing the rate of extrusion or by the length of the conveyor under the cooling media.

I claim:

1. A method of forming blocks of pasta filata cheese, comprising the following steps:
    a. extruding, a ribbon of warm, plastic, pasta filata cheese, onto a conveyor;
    b. transporting said ribbon on said conveyor;
    c. chilling the ribbon, while the ribbon is being transported, by contacting the ribbon with a chilling medium;
    d. maintaining contact of the chilling medium with the ribbon of pasta filata, while the ribbon is being transported, until the ribbon sets up;
    e. laminating ribbons by stacking, one on top of stack another, set up ribbons, to a desired height, while the ribbons are being transported; and
    f. cutting the stacked ribbons into desired lengths.

2. A method of forming blocks of pasta filata cheese, as recited in claim 1, further comprising:
    a. compressing the stacked ribbons, after stacking, prior to cutting the stacked ribbons, to improve lamination.

3. A method of forming blocks of pasta filata cheese, as recited in claim 1, further comprising:
    a. bagging sections of stacked ribbons; and
    b. heat shrinking the bag to improve lamination of the stacked ribbons.

4. A method of forming blocks of pasta filata cheese, as recited in claim 1, wherein the cooling media is selected from the group consisting of brine, water, and super cooled air.

5. A method of forming blocks of pasta filata cheese, comprising the following steps:
    a. extruding warm plastic, pasta filata cheese, into a plurality of ribbons;
    b. transporting the plurality of ribbons, on a plurality of conveyors;
    c. chilling the ribbons of warm, plastic, pasta filata cheese, while the ribbons are being transported on the conveyors, by contacting the ribbons with a chilling media;
    d. maintaining contact of the chilling media with the ribbons, while the ribbons are being transported, until the ribbons are chilled below the slump temperature of the ribbons;
    e. laminating the ribbons, by stacking the ribbons, one on top of another, lengthwise, during transport; and
    f. cutting the stacked ribbons to the desired length.

6. A method of forming blocks of pasta filata cheese, as recited in claim 5, further comprising:
    a. compressing the stacked ribbons, after stacking, prior to cutting the stacked ribbons, to improve lamination.

7. A method of forming blocks of pasta filata cheese, as recited in claim 5, further comprising:
    a. bagging sections of stacked ribbons; and
    b. heat shrinking the bag to improve lamination of the stacked ribbons.

8. A method of forming blocks of pasta filata cheese, as recited in claim 5, wherein the cooling media is selected from the group consisting of brine, water, and super cooled air.

9. A method of forming blocks of pasta filata cheese, comprising the following steps:
    a. extruding mixed, warm, plastic pasta filata cheese into a ribbon;
    b. transporting said ribbon on a conveyor;
    c. chilling the ribbon, below the slump temperature of the cheese ribbon, while the ribbon is being transported on the conveyor;
    d. forming multiple ribbons, by slitting the single ribbon lengthwise;
    e. laminating the ribbons, by stacking the multiple ribbons, one on top of the other;
    f. cutting the stacked ribbons into desired lengths.

10. A method of forming blocks of pasta filata cheese, as recited in claim 7, further comprising:
    a. compressing the stacked ribbons, after stacking, prior to cutting the stacked ribbons, to improve lamination.

11. A method of forming blocks of pasta filata cheese, as recited in claim 7, further comprising:
    a. bagging sections of stacked ribbons; and b. heat shrinking the bag to improve lamination of the stacked ribbons.

12. A method of forming blocks of pasta filata cheese, as recited in claim 7, wherein the cooling media is selected from the group consisting of brine, water, and super cooled air.

13. Method of forming blocks of pasta filata cheese, comprising the steps of:
   a. extruding a ribbon of warm, plastic, pasta filata cheese, onto a conveyor;
   b. applying a chilling medium to the ribbon, while the ribbon is transported on the conveyor;
   c. maintaining the contact of the chilling medium, with the ribbon, until a length of the ribbon sets up;
   d. laminating lengths of ribbon by stacking lengths of set up ribbon, one on top of another, to a desired height;
   e. cutting lengths of laminated ribbon to a desired length.

14. Method of forming blocks of pasta filata cheese, as in claim 11, further comprising the step of:
   a. applying pressure to the stacked ribbons, sufficient to promote contact with, and lamination of the stacked ribbons, to a single block.

* * * * *